US012238833B2

(12) United States Patent
Wang et al.

(10) Patent No.: US 12,238,833 B2
(45) Date of Patent: Feb. 25, 2025

(54) LED CONTROL CIRCUIT AND ELECTRONIC DEVICE, AND ELECTRONIC APPARATUS

(71) Applicant: REALMAGIC SEMICONDUCTORS (SHENZHEN) CO., LTD., Guangdong (CN)

(72) Inventors: Wei Wang, Guangdong (CN); Jing Han, Guangdong (CN)

(73) Assignee: REALMAGIC SEMICONDUCTORS (SHENZHEN) CO., LTD., Guangdong (CN)

(*) Notice: Subject to any disclaimer, the term of this patent is extended or adjusted under 35 U.S.C. 154(b) by 0 days.

(21) Appl. No.: 18/725,646

(22) PCT Filed: Aug. 30, 2022

(86) PCT No.: PCT/CN2022/115852

§ 371 (c)(1),
(2) Date: Jun. 28, 2024

(87) PCT Pub. No.: WO2023/221330

PCT Pub. Date: Nov. 23, 2023

(65) Prior Publication Data

US 2024/0422874 A1 Dec. 19, 2024

(30) Foreign Application Priority Data

May 17, 2022 (CN) ......................... 202221185437.3

(51) Int. Cl.
*H05B 45/00* (2022.01)
*H05B 45/30* (2020.01)

(52) U.S. Cl.
CPC .................................... *H05B 45/30* (2020.01)

(58) Field of Classification Search
CPC ........ H05B 45/00; H05B 45/30; H05B 45/37; H05B 45/375
See application file for complete search history.

(56) References Cited

U.S. PATENT DOCUMENTS

2011/0121748 A1* 5/2011 Kuo ...................... H03M 7/006 341/899
2013/0217347 A1 8/2013 Seshita
(Continued)

FOREIGN PATENT DOCUMENTS

CN 101778507 A 7/2010
CN 102696282 A 9/2012
(Continued)

OTHER PUBLICATIONS

Written Opinion of the the International Search Authority, for PCT/CN2022/115858, Mailed Nov. 28, 2022, 8 pages including the English Translation.

*Primary Examiner* — Thai Pham
(74) *Attorney, Agent, or Firm* — Brooks Kushman P.C.

(57) ABSTRACT

An LED control circuit and an electronic device, and an electronic apparatus. The LED control circuit includes a power terminal, a grounding terminal, and a plurality of control signal outputs, and a level recognition circuit outputs a digital signal according to a voltage difference between a voltage at the power terminal and a voltage at the grounding terminal. a decoding circuit parses the digital signal to obtain control data of the LED control circuit, and output a plurality of control signals to a plurality of control signal outputs according to the control data. Thus, a reference circuit for providing the reference voltage is omitted, a circuit configuration is simplified and a hardware cost is reduced.

24 Claims, 11 Drawing Sheets

(56) References Cited

U.S. PATENT DOCUMENTS

| | | | | |
|---|---|---|---|---|
| 2019/0141810 | A1* | 5/2019 | Zhang | H05B 47/185 |
| 2019/0393865 | A1 | 12/2019 | Jung | |
| 2020/0357319 | A1* | 11/2020 | Xu | G09G 3/20 |
| 2023/0049359 | A1* | 2/2023 | Zou | H04L 27/02 |
| 2023/0144258 | A1* | 5/2023 | Fu | H05B 45/345<br>315/291 |
| 2024/0172351 | A1* | 5/2024 | Zhang | G09G 3/32 |

FOREIGN PATENT DOCUMENTS

| | | | |
|---|---|---|---|
| CN | 203574631 | | 4/2014 |
| CN | 204157098 | | 2/2015 |
| CN | 104735879 | A | 6/2015 |
| CN | 105007657 | A | 10/2015 |
| CN | 107041034 | A | 8/2017 |
| CN | 107896400 | A | 4/2018 |
| CN | 108206685 | A | 6/2018 |
| CN | 207531133 | | 6/2018 |
| CN | 109302777 | A | 2/2019 |
| CN | 109523957 | A | 3/2019 |
| CN | 110192240 | A | 8/2019 |
| CN | 110635679 | A | 12/2019 |
| CN | 209747106 | | 12/2019 |
| CN | 111521861 | A | 8/2020 |
| CN | 111585533 | A | 8/2020 |
| CN | 111668809 | A | 9/2020 |
| CN | 112289253 | A | 1/2021 |
| CN | 113131436 | A | 7/2021 |
| CN | 214338164 | | 10/2021 |
| EP | 3306818 | A1 | 4/2018 |
| JP | 2009048857 | A | 3/2009 |
| JP | 2017174336 | A | 9/2017 |

* cited by examiner

LED CONTROL CIRCUIT AND ELECTRONIC DEVICE, AND ELECTRONIC APPARATUS

CROSS-REFERENCE TO RELATED APPLICATIONS

This application is a 35 U.S.C. § 371 national stage application of PCT patent application No. PCT/CN2022/115852, filed on Aug. 30, 2022, which claims priority to Chinese patent application No. 202221185437.3, filed on May 17, 2022, and entitled "LED control circuit and electronic device, and electronic apparatus", the entire contents of which is incorporated herein by reference.

TECHNICAL FIELD

The present application pertains to the field of LED circuit technologies, and more particularly, to an LED control circuit and an electronic device, and an electronic apparatus.

BACKGROUND

Currently, in order to control various states (e.g., gradual change and explosion) of an LED, signal wires are required to transmit instructions to the LED control circuit. In order to save the signal line, reduce the cost and reduce a complexity of a system, an associated LED control circuit uses a ground wire to transmit an instruction so as to control the LED.

The associated LED control circuit includes a reference circuit, a signal recognition circuit and a data decoding circuit. The reference circuit is used for generating a reference voltage and outputting the reference voltage to the signal recognition circuit; the signal recognition circuit generates an internal standard digital signal according to the reference voltage and sends the internal standard digital signal to the data decoding circuit.

Due to the fact that the reference circuit needs to provide the reference voltage to the signal recognition circuit in the associated LED control circuit, complex circuit configuration and high hardware cost are caused.

SUMMARY

An objective of the present application is to provide an LED control circuit and an electronic device, and an electronic apparatus, which seek to solve a problem that the technique of maintenance of the associated LED control circuit is sophisticated and the cost is much higher.

In order to solve the aforesaid technical problem, the technical solutions adopted by the present application are set forth below:

In accordance with the first aspect, an LED control circuit is provided. The LED control circuit has a power terminal, a grounding terminal, and a plurality of control signal outputs. The LED control circuit includes:

- a level recognition circuit, connected to the power terminal and the grounding terminal of the LED control circuit, and being configured to output a digital signal according to a voltage difference between a voltage at the power terminal and a voltage at the grounding terminal; and
- a decoding circuit, connected to the level recognition circuit and the plurality of control signal outputs of the LED control circuit, and being configured to parse the digital signal to obtain control data of the LED control circuit, and output a plurality of control signals to the plurality of control signal outputs according to the control data.

In accordance with the second aspect, an electronic apparatus is further provided in the embodiments of the present application. The electronic apparatus includes a controller and n LED control circuits described above.

A power terminal of a first LED control circuit in the LED control circuits is connected to a positive electrode of a power supply and a power terminal of the controller, a grounding terminal of a n-th LED control circuit in the n LED control circuits is connected to an input of the controller. A grounding terminal of a i-th LED control circuit in the n LED control circuits is connected to a power terminal of a (i+1)-th LED control circuit in the n LED control circuits. An output of the controller is connected to a negative electrode of the power supply.

The controller is configured to control an input of the controller and an output of the controller to be switched on/off.

Where, n is a natural number greater than 1, and i is a positive integer less than n.

In accordance with the third aspect, an electronic device is further provided in the embodiments of the present application. The electronic device includes a DC-DC converter circuit, a signal transmission circuit, a first switch circuit, and m LED control circuits described above.

A power terminal of a first LED control circuit in the n LED control circuits is connected to a positive electrode of a power supply, a grounding terminal of a m-th LED control circuit in the n LED control circuits is connected to an input of the first switch circuit and an input of the DC-DC conversion circuit. A grounding terminal of a j-th LED control circuit in the n LED control circuits is connected to a power terminal of a (j+1)-th LED control circuit in the n LED control circuits. An output of the first switch circuit is connected to a negative electrode of the power supply and a grounding terminal of the DC-DC conversion circuit, and an output of the signal transmission circuit is connected to a control terminal of the first switch circuit.

The signal transmission circuit is configured to output a first control signal.

The first switch circuit is configured to be switched on or switched off according to the first control signal.

The DC-DC conversion circuit is configured to clamp a voltage at a grounding terminal of each of the m LED control circuits when the first switch circuit is switched off.

Where, m is a natural number greater than 1, and j is a positive integer less than M.

As compared to the related art, the embodiments of the present application have the following beneficial effects: since the level recognition circuit merely outputs the digital signal according to the voltage difference between the voltage at the power terminal and the voltage at the grounding terminal, the level recognition circuit does not need to take a reference voltage as a reference signal, thus, a reference circuit for providing the reference voltage is omitted, a circuit configuration is simplified and a hardware cost is reduced.

DESCRIPTION OF THE DRAWINGS

In order to describe the technical invention in the embodiments of the present application more clearly, a brief introduction regarding the accompanying drawings that need to be used for describing the embodiments of the present application is given below. It is obvious that the accompanying drawings described below are merely some embodiments of the present application, a person of ordinary skill in the art may also obtain other drawings according to the current drawings without paying creative efforts.

DETAILED DESCRIPTION OF EMBODIMENTS

In order to make the technical problems, the technical solutions and the beneficial effects of the present application be clearer and more understandable, the present application will be further described in detail below with reference to the embodiments. It should be understood that the embodiments described herein are only intended to illustrate but not to limit the present application.

It is worth noting that, when describing that one component is "fixed to" or "arranged on" another component, this component may be directly or indirectly arranged on another component. When describing that one component "is connected with" another component, this component may be directly or indirectly connected to the another component.

It needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only for the purpose of describing the present application conveniently and simplifying the description of the present application, rather than being intended to indicate or imply that an indicated device or component must have specific locations or be constructed and manipulated according to specific locations. Thus, these terms shouldn't be interpreted as limitations to the present application.

In addition, terms of "the first" and "the second" are only used for description purposes, and should not be considered as indicating or implying any relative importance, or implicitly indicating the number of indicated technical features. As such, technical feature(s) restricted by "the first" or "the second" can explicitly or implicitly include one or more of the technical feature(s). In the description of the present application, "a plurality of" has the meaning of two or more, unless additional explicit and specific definition of "a plurality of" is provided.

Figure 1:
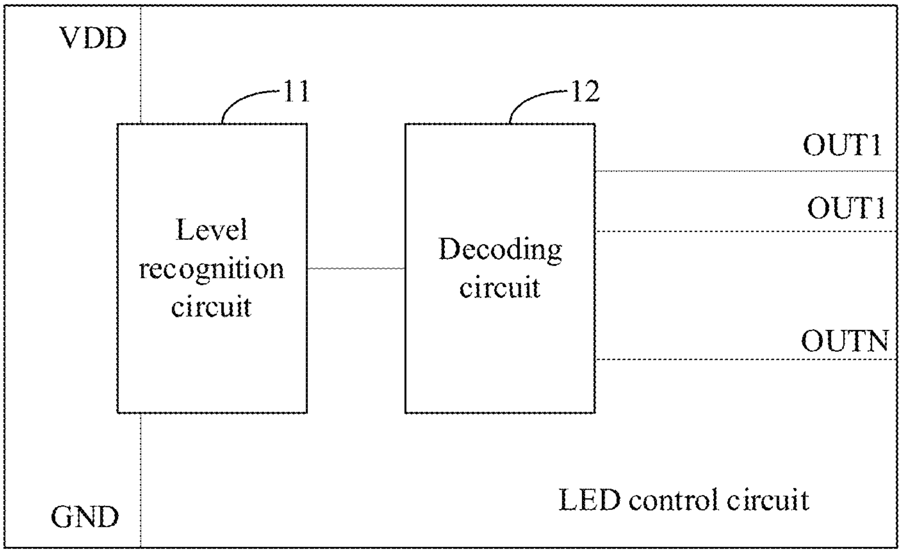
FIG. 1 is a schematic structural diagram of an LED control circuit provided in one embodiment of the present application.

FIG. 1 illustrates a schematic structural diagram of an LED control circuit according to one preferable embodiment of the present application. For the convenience of illustration, the part associated with the embodiments of the present application is illustrated merely.

The LED control circuit includes a power terminal VDD, a grounding terminal GND, and a plurality of control signal outputs OUT. The LED control circuit includes a level recognition circuit 11 and a decoding circuit 12.

The level recognition circuit 11 is connected to the power terminal VDD and the grounding terminal GND of the LED control circuit, and is configured to output a digital signal according to a voltage difference between the voltage at the power terminal VDD and the voltage at the grounding terminal GND.

The decoding circuit 12 is connected to the level recognition circuit 11 and a plurality of control signal outputs of the LED control circuit, and is configured to parse the digital signal to obtain control data of the LED control circuit, and output a plurality of control signals to the plurality of control signal outputs OUT according to the control data.

Figure 2:
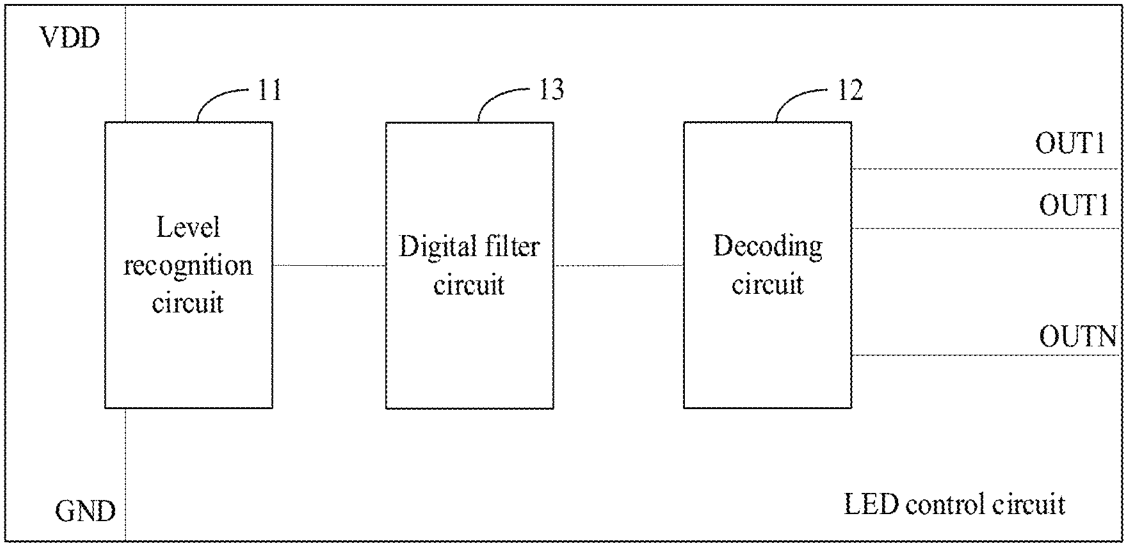
FIG. 2 is another schematic structural diagram of the LED control circuit provided in one embodiment of the present application.

As shown in FIG. 2, the LED control circuit further includes a digital filter circuit 13.

The digital filter circuit 13 is connected between the level recognition circuit 11 and the decoding circuit 12, and is configured to perform digital filtering on the digital signal.

The decoding circuit 12 is specifically configured to parse the digitally filtered digital signal to obtain the control data of the LED control circuit, and output the plurality of control signals to the plurality of control signal outputs according to the control data.

By performing the digital filtering on the digital signal, a bit error rate of the digital signal is reduced, and a stability of the LED control circuit is improved.

It is worth noting that the digital filter circuit 13 and the decoding circuit 12 may be reset according to the same reset signal and may be operated according to the same clock signal.

Figure 3:
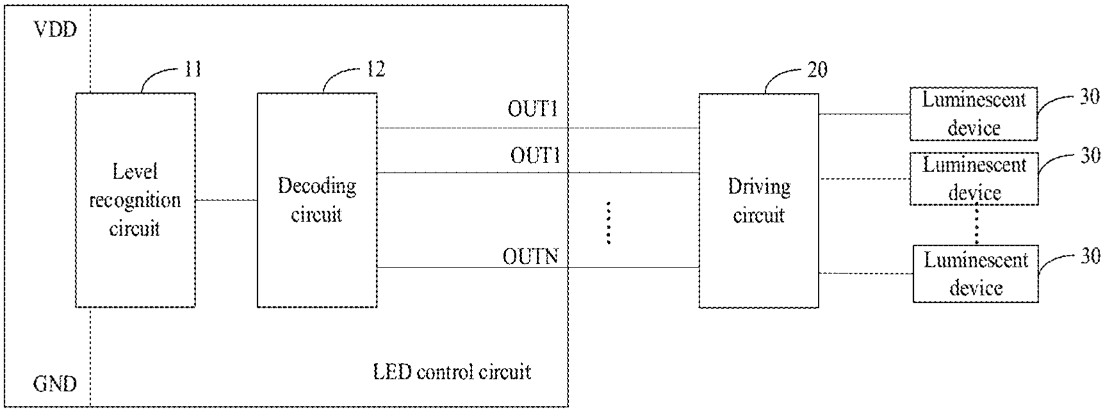
FIG. 3 is another schematic structural diagram of the LED control circuit provided in one embodiment of the present application.

As shown in FIG. 3, the plurality of control signal outputs OUTPUT of the LED control circuit are connected to a driving circuit 20.

The driving circuit 20 is configured to output a plurality of driving signals according to the plurality of control signals to enable a plurality of luminescent devices 30 to emit light.

Figure 4:
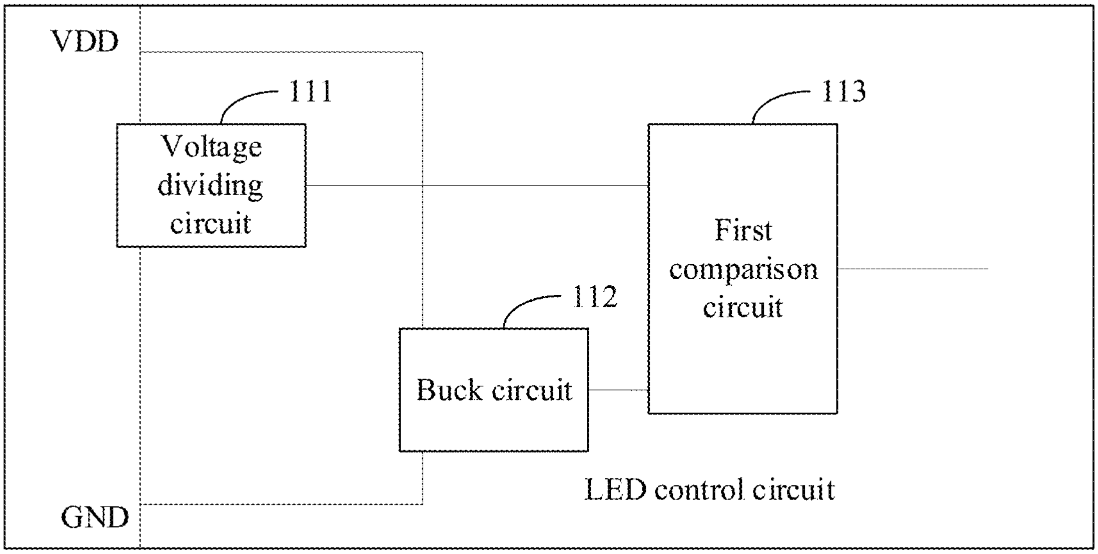
FIG. 4 is a schematic structural diagram of a level recognition module in the LED control circuit provided in one embodiment of the present application.

By way of example rather than limitation, as shown in FIG. 4, the level recognition circuit 11 includes a voltage dividing circuit 111, a buck circuit 112, and a first comparison circuit 113.

The voltage dividing circuit 111 is connected to the power terminal VDD and the grounding terminal GND of the LED control circuit, and is configured to divide the voltage difference between the voltage at the power terminal VDD and the voltage at the grounding terminal GND to output a first voltage.

The buck circuit 112 is connected to the power terminal VDD and the grounding terminal GND of the LED control circuit, and is configured to perform a voltage drop of a preset value on the voltage at the power terminal to output a second voltage.

The first comparison circuit 113 is connected to the decoding circuit 12, the voltage dividing circuit 111, and the buck circuit 112, and is configured to compare the first voltage with the second voltage, and output a digital signal according to a comparison result.

The voltage difference between the voltage at the power terminal VDD and the voltage at the grounding terminal GND is recognized through the voltage dividing circuit 111, the buck circuit 112 and the first comparison circuit 113, thus, the reference voltage which serves as the reference signal is not required, a reference circuit for providing the reference voltage is omitted, the circuit is simplified, and the hardware cost is reduced. Moreover, since the voltage dividing circuit may be modulated in a large range, a great voltage difference between the voltage at the power terminal VDD and the voltage at the grounding terminal GND may be adapted, and the application range of the LED control circuit is expanded.

Figure 5:
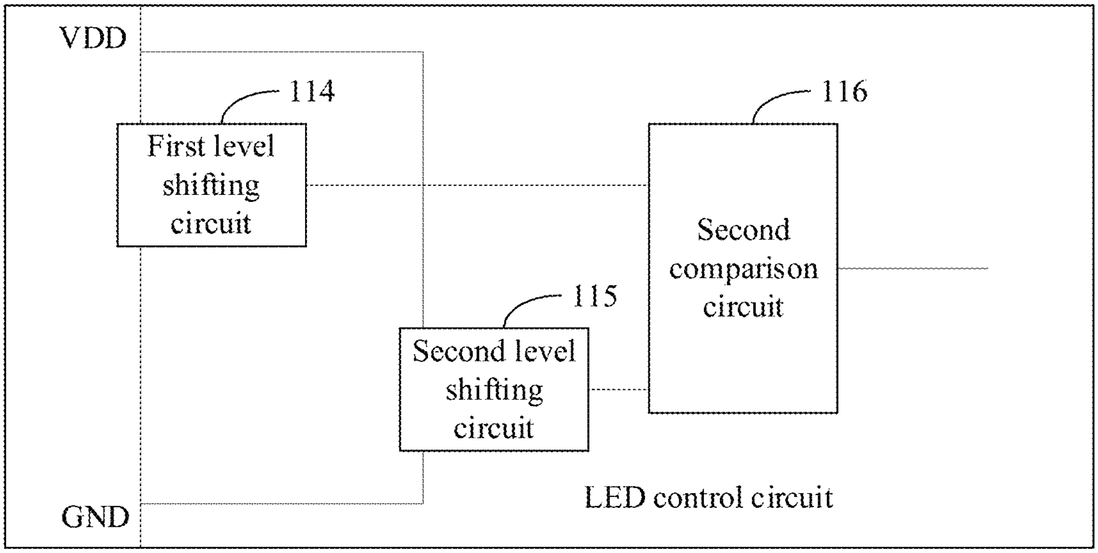
FIG. 5 is another schematic structural diagram of the level recognition module in the LED control circuit provided in one embodiment of the present application.

By way of example rather than limitation, as shown in FIG. 5, the level recognition circuit 11 includes a first level shifting circuit 114, a second level shifting circuit 115, and a second comparison circuit 116.

The first level shifting circuit 114 is connected to the power terminal VDD and the grounding terminal GND of the LED control circuit, and is configured to perform level shifting on the voltage at the grounding terminal GND to output a third voltage.

The second level shifting circuit 115 is connected to the power terminal VDD and the grounding terminal GND of the LED control circuit, and is configured to perform level shifting on the voltage at the power terminal VDD to output a fourth voltage.

The second comparison circuit 116 is connected to the decoding circuit 12, the first level shifting circuit 114, and the second level shifting circuit 115, and is configured to compare the third voltage with the fourth voltage and output the digital signal according to the comparison result.

The voltage difference between the voltage at the power terminal and the voltage at the grounding terminal is recognized through the first level shifting circuit 114, the second level shifting circuit 115, and the second comparison circuit 116 and thus the digital signal is output. Since the level shifting circuits are realized by utilizing diodes or field-effect transistors, arrangement of resistors are unnecessary. Thus, space occupation of circuit board is reduced.

Figure 6:
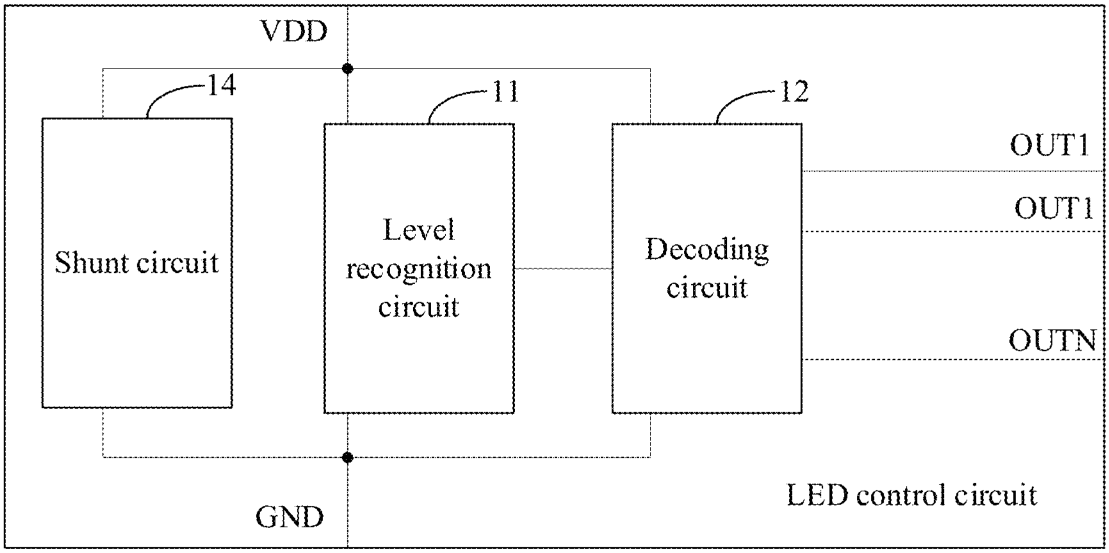
FIG. 6 is another schematic structural diagram of the LED control circuit provided in one embodiment of the present application.

It should be emphasized that the decoding circuit 12 may also be powered by the voltage difference between the voltage at the power terminal VDD and the voltage at the grounding terminal GND. As shown in FIG. 6, the LED control circuit further includes a shunt circuit 14.

The shunt circuit 14 is connected between the power terminal VDD and the grounding terminal GND, and is configured to shunt a current between the power terminal VDD and the grounding terminal GND.

Since the shunt circuit 14 shunts the current between the power terminal VDD and the grounding terminal GND, the supply voltage (i.e., the voltage between the power terminal VDD of each LED control circuit and the grounding terminal GND of each LED control circuit) of each of the LED control circuits connected in series is adjusted, ground device can be avoided from being damaged caused due to overvoltage of the supply voltage of the LED control circuit.

Figure 7:
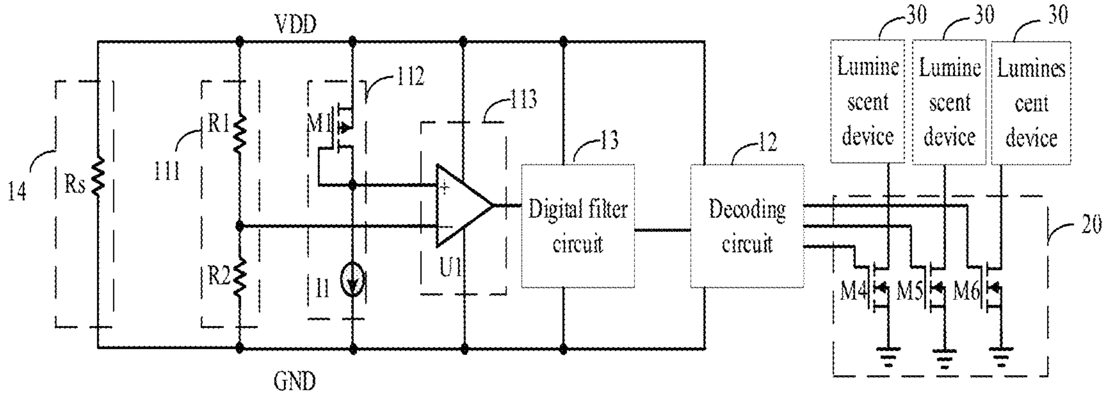
FIG. 7 is an exemplified circuit principle diagram of a part of the LED control circuit provided in one embodiment of the present application.
Figure 8:
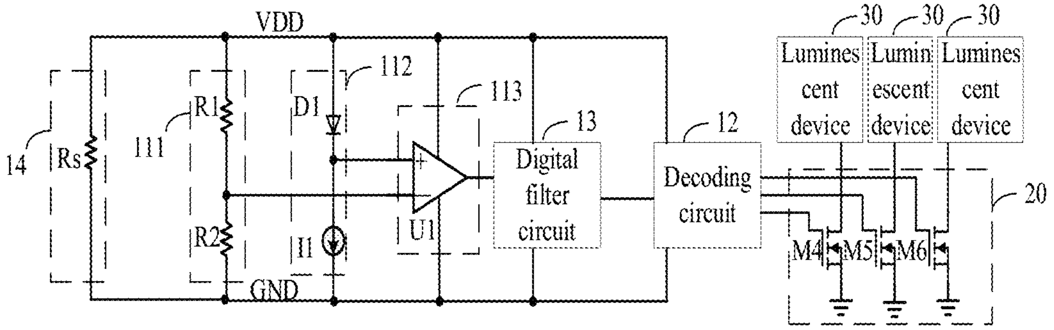
FIG. 8 is another exemplified circuit principle diagram of a part of the LED control circuit provided in one embodiment of the present application.
Figure 9:
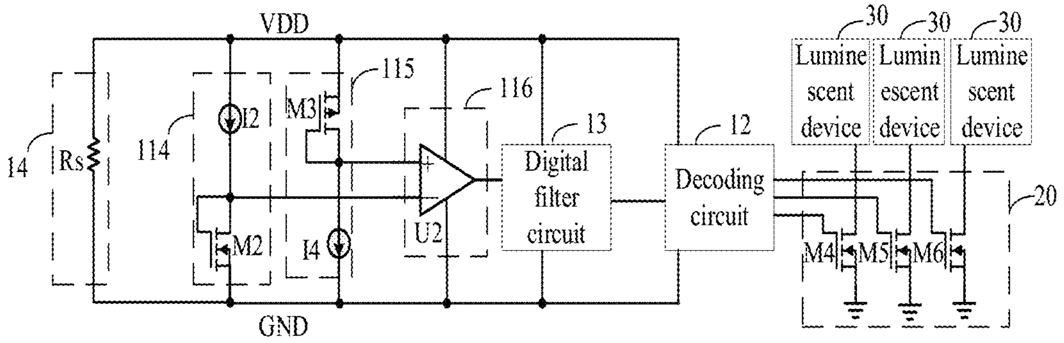
FIG. 9 is another exemplified circuit principle diagram of a part of the LED control circuit provided in one embodiment of the present application.
Figure 10:
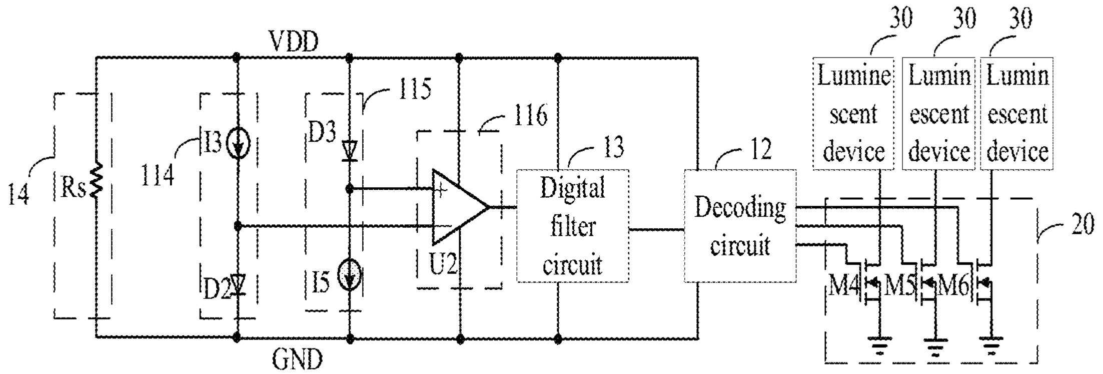
FIG. 10 is another exemplified circuit principle diagram of a part of the LED control circuit provided in one embodiment of the present application.

FIG. 7 illustrates an exemplified circuit configuration of a part of the LED control circuit provided in one embodiment of the present application, FIG. 8 illustrates another exemplified circuit configuration of a part of the LED control circuit, FIG. 9 illustrates another exemplified circuit configuration of a part of the LED control circuit provided in one embodiment of the present application, and FIG. 10 shows another partial example circuit structure of the LED control circuit according to one embodiment of the present application. For ease of description, only a part related to the embodiments of the present application is shown, and details are described below:

As shown in FIG. 7, the buck circuit 112 includes a first field-effect transistor M1 and a first current source I1.

A source electrode of the first field-effect transistor M1 is connected to the power terminal VDD of the LED control circuit, an output of the first current source I1 is connected to the grounding terminal GND of the LED control circuit, a drain electrode of the first field-effect transistor M1, a gate electrode of the first field-effect transistor M1, and an input of the first current source I1 are used together as a second voltage output of the buck circuit 112, is connected to the first comparison circuit 113 so as to output a second voltage.

The source electrode of the first field-effect transistor M1 is connected to the power terminal VDD of the LED control circuit, the drain electrode of the first field-effect transistor M1 is connected to the gate electrode of the first field-effect transistor M1, then, the drain electrode of the first field-effect transistor M1 and the gate electrode of the first field-effect transistor M1 are connected to the comparison circuit 113. In this way, performing a voltage drop of the first preset value on the voltage at the power terminal VDD of the LED control circuit is realized.

As shown in FIG. 8, the buck circuit 112 includes a first diode D1 and a second current source I2.

A positive electrode of the first diode D1 is connected to the power terminal VDD of the LED control circuit, an output of the second current source I2 is connected to the grounding terminal GND of the LED control circuit, a negative electrode of the first diode D1 and an input of the first current source I1 are used together as a second voltage output of the buck circuit 112, and are connected to the first comparison circuit 113 to output the second voltage.

The positive electrode of the first diode D1 is connected to the power terminal VDD of the LED control circuit, and the negative electrode of the first diode is connected to the first comparison circuit 113. In this way, performing the voltage drop of the first preset value on the voltage at the power terminal VDD of the LED control circuit is realized.

As shown in FIG. 7 and FIG. 8, the voltage dividing circuit 111 includes a first resistor R1 and a second resistor R2.

A first end of the first resistor R1 is connected to the power terminal VDD of the LED control circuit, a first end of the second resistor R2 is connected to the grounding terminal GND of the LED control circuit, a second terminal of the first resistor R1 and a second terminal of the second resistor R2 are used together as a first voltage output of the voltage dividing circuit 111, and are connected to the first comparison circuit 113 to output the first voltage.

The voltage dividing circuit 111 is simple and reliable.

As shown in FIG. 7 and FIG. 8, a non-inverting input of the first comparator U1 is used as a second voltage input of the first comparison circuit 113, and is connected to the buck circuit 112 to access the second voltage; the inverting input of the first comparator U1 is used as a first voltage input of the first comparison circuit 113 and is connected to the voltage dividing circuit 111 to access a first voltage; and an output of the first comparator U1 is used as a digital signal output of the first comparison circuit 113 and is connected to the decoding circuit 12 to output a digital signal.

The first comparison circuit 113 is simple and reliable in structure.

As shown in FIG. 9, the first level shifting circuit 114 includes a second field-effect transistor M2 and a second current source I2.

A first end of the second current source I2 is connected to the power terminal VDD of the LED control circuit, a source electrode of the second field-effect transistor M2 is connected to the grounding terminal GND of the LED control circuit, a second end of the second current source I2, a gate electrode of the second field-effect transistor M2, and a drain electrode of the second field-effect transistor M2 are used together as a third voltage output of the first level shifting circuit 114, and are connected to the second comparison circuit 116 to output a third voltage.

The source electrode of the second field-effect transistor M2 is connected to the grounding terminal GND of the LED control circuit, the gate electrode of the second field-effect transistor M2 is connected to the drain electrode of the second field-effect transistor M2, then, the gate electrode of the second field-effect transistor M2 and the drain electrode of the second field-effect transistor M2 are connected to the second comparison circuit 116. In this way, performing an upward level shifting of the second preset value on the voltage at the grounding terminal GND of the LED control circuit is realized.

As shown in FIG. 9, the second level shifting circuit 115 includes a third field-effect transistor M3 and a fourth current source I4.

A source electrode of the third field-effect transistor M3 is connected to a power terminal VDD of the LED control circuit, an output of the fourth current source I4 is connected to the grounding terminal GND of the LED control circuit, a drain electrode of the third field-effect transistor M3, a gate electrode of the third field-effect transistor M3, and an input of the fourth current source I4 are used together as a fourth voltage output of the second level shifting circuit 115, and are connected to the second comparison circuit 116 to output a fourth voltage.

The source electrode of the third field-effect transistor M3 is connected to the power terminal VDD of the LED control circuit, the drain electrode of the third field-effect transistor M3 is connected to the gate electrode of the third field-effect transistor M3, then, they are connected to the second comparison circuit 116. In this way, performing a downward level shifting of the third preset value on the voltage at the power terminal VDD of the LED control circuit is realized.

As shown in FIG. 10, the first level shifting circuit 114 includes a second diode D2 and a third current source I3.

A first end of the third current source I3 is connected to the power terminal VDD of the LED control circuit, a negative electrode of the second diode D2 is connected to the grounding terminal GND of the LED control circuit, and a second end of the third current source I3 and a positive electrode of the second diode D2 are used together as a third voltage output of the first level shifting circuit 114, which is connected to the second comparison circuit 116 to output the third voltage.

The negative electrode of the second diode D2 is connected to the grounding terminal GND of the LED control circuit, and the positive electrode of the second diode D2 is connected to the second comparison circuit 116. In this way, an upward level shifting of a second preset value exerting on the voltage at the grounding terminal GND of the LED control circuit is realized.

As shown in FIG. 10, the second level shifting circuit 115 includes a third diode D3 and a fifth current source I5.

A positive electrode of the third diode D3 is connected to the power terminal VDD of the LED control circuit, an output of the fifth current source I5 is connected to the grounding terminal GND of the LED control circuit, and an negative electrode of the third diode D3 and an input of the fifth current source I5 are used together as a fourth voltage output of the second level shifting circuit 115, which is connected to the second comparison circuit 116 to output a fourth voltage.

The positive electrode of the third diode D3 is connected to the power terminal VDD of the LED control circuit, and the negative electrode of the third diode D3 is connected to the second comparison circuit 116. In this way, performing a downward level shifting of the third preset value on the voltage at the power terminal VDD of the LED control circuit is realized.

As shown in FIG. 9 and FIG. 10, the second comparison circuit 116 includes a second comparator U2.

The non-inverting input of the second comparator U2 serves as the fourth voltage input of the second comparison circuit 116, and is connected to the second level shifting circuit 115 to access the fourth voltage; an inverting input of the second comparator U2 serves as a third voltage input of the second comparison circuit 116 and is connected to the first level shifting circuit 114 to access the third voltage. An output of the second comparator U2 serves as a digital signal output of the second comparison circuit 116 and is connected to the decoding circuit 12 to output the digital signal.

As shown in FIGS. 7-10, the driving circuit 20 includes a fourth field-effect transistor M4, a fifth field-effect transistor M5 and a sixth field-effect transistor M6. The shunt circuit 14 includes a shunt resistor Rs.

What illustrated in FIGS. 7-10 are further described below with reference to the working principle:

In FIG. 7 and FIG. 8, the first resistor R1 and the second resistor R2 divide the voltage difference between the voltage at the power terminal VDD and the voltage at the grounding terminal GND to output the first voltage to the inverting input of the comparator U1.

In FIG. 7, the field-effect transistor M1 performs a voltage drop of a preset value on the voltage at the power terminal VDD to output a second voltage to a non-inverting input of the first comparator U1.

In FIG. 8, the diode D1 performs a voltage drop of a preset value on the voltage at the power terminal VDD to output a second voltage to the non-inverting input of the first comparator U1.

In FIGS. 7 and 8, the first comparator U1 compares the first voltage with the second voltage, and outputs a digital signal according to a comparison result. The digital filter circuit 13 performs digital filtering on the digital signal. The decoding circuit 12 parses the digitally filtered digital signal to obtain the control data of the LED control circuit, and outputs the plurality of control signals to the plurality of control signal outputs respectively according to the control data. A gate electrode of the fourth field-effect transistor M4, a gate electrode of the fifth field-effect transistor M5 and a gate electrode of the sixth field-effect transistor M6 are connected to a plurality of control signals respectively, and a plurality of driving signals are respectively output from a drain electrode of the fourth field-effect transistor M4, a drain electrode of the fifth field-effect transistor M5 and a drain electrode of the sixth field-effect transistor M6, thus, a plurality of luminescent devices 30 (e.g., a light-emitting diode LED1, a light-emitting diode LED2 and a light-emitting diode LED3) are enabled to emit light. It should be noted that, the first comparator U1, the digital filter circuit 13 and the decoding circuit 12 are powered according to the voltage difference between the voltage at the power terminal VDD and the voltage at the grounding terminal GND. The shunt resistor Rs shunts the current between the power terminal VDD and the grounding terminal GND.

In FIG. 9, the second field-effect transistor M2 performs level shifting on the voltage at the grounding terminal GND to output the third voltage to the inverting input of the second comparator U2. The third field-effect transistor M3 performs level shifting on the voltage at the power terminal VDD to output the fourth voltage to a non-inverting input of the second comparator U2.

In FIG. 10, the second diode D2 performs level shifting on the voltage at the grounding terminal GND to output the third voltage to the inverting input of the second comparator U2. The third diode D3 performs level shifting on the voltage at the power terminal VDD to output the fourth voltage to the non-inverting input of the second comparator U2.

In FIG. 9 and FIG. 10, the second comparator U2 compares the third voltage with the fourth voltage, and outputs a digital signal according to a comparison result. The digital filter circuit 13 performs digital filtering on the digital signal. The decoding circuit 12 parses the digitally filtered digital signal to obtain the control data of the LED control circuit, and outputs a plurality of control signals to the plurality of control signal outputs according to the control data. The gate electrode of the fourth field-effect transistor M4, the gate electrode of the fifth field-effect transistor M5 and the gate electrode of the sixth field-effect transistor M6 receive a plurality of control signals, and a plurality of driving signals are output from the drain electrode of the fourth field-effect transistor M4, the drain electrode of the fifth field-effect transistor M5 and the drain electrode of the sixth field-effect transistor M6, thus, the plurality of luminescent devices 30 (e.g., the light-emitting diode LED1, the light-emitting diode LED2 and the light-emitting diode LED3) are enabled to emit light. It should be noted that the second comparator U2, the digital filter circuit 13 and the decoding circuit 12 are powered according to the voltage difference between the voltage at the power terminal VDD and the voltage at the grounding terminal GND. The shunt resistor Rs shunts the current between the power terminal VDD and the grounding terminal GND.

Figure 11:
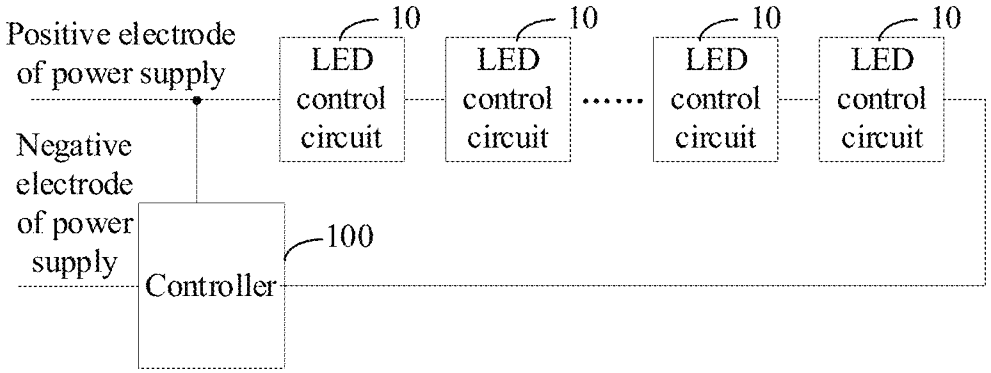
FIG. 11 is a schematic structural diagram of an electronic apparatus provided in one embodiment of the present application.

An electronic apparatus is further provided in the embodiments of the present application. As shown in FIG. 11, the electronic apparatus includes a controller 100 and n LED control circuits 10 as described above. A power terminal of the first LED control circuit 10 is connected to a positive electrode of the power supply and a power terminal of the controller 100, a grounding terminal of a n-th LED control circuit 10 is connected to an input of the controller 100, a grounding terminal of the i-th LED control circuit 10 is connected to a power terminal of the (i+1)-th LED control circuit 10, and an output of the controller 100 is connected to a negative electrode of the power supply. The controller 100 is configured to control an input of the controller 100 and an output of the controller 100 to be switched on/off, where N is a natural number greater than 1, and i is a positive integer less than N.

When the controller 100 controls the input and the output of the controller 100 to be switched off, the positive electrode of the power supply is connected to the negative electrode of the power supply through the aforesaid n LED control circuits 10. In this case, in each LED control circuit 10, the first voltage output by the voltage dividing circuit is the voltage at the positive electrode of the power supply, and voltage drop is performed on the second voltage output by the buck circuit experiences for one or multiples times. Thus, the first voltage is greater than the second voltage, and the digital signal is at a low level. When the controller 100 controls the input and the output of the controller 100 to be switched on, the positive electrode of the power supply is connected to the negative electrode of the power supply through the aforesaid n LED control circuits 10. In this case, in each LED control circuit 10, the first voltage output by the voltage dividing circuit is the voltage obtained by dividing the voltage difference between the voltage at the power terminal and the voltage of the grounding terminal, and a voltage drop of a preset value is performed on the voltage at the power terminal according to the second voltage output by the buck circuit. In this case, the first voltage is less than the second voltage, and the digital signal is at a high level. Thus, transmitting instructions via ground wires to realize the control of the LED is realized.

Figure 12:
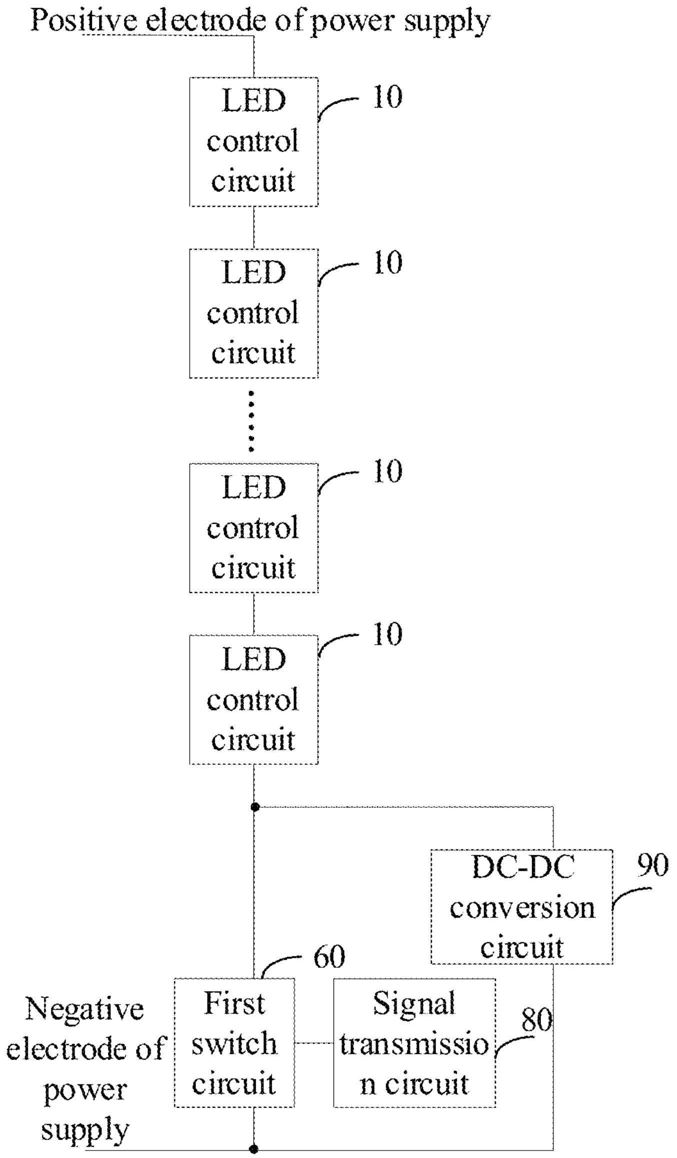
FIG. 12 is a schematic structural diagram of an electronic device provided in one embodiment of the present application.

An electronic device is further provided in the embodiments of the present application, as shown in FIG. 12, the electronic device includes a DC-DC converter circuit 90, a signal transmission circuit 80, a first switch circuit 60, and m LED control circuits 10. A power terminal of the first LED control circuit 10 is connected to a positive electrode of the power supply, a grounding terminal of the m-th LED control circuit 10 is connected to an input of the first switch circuit 60 and an input of the DC-DC converter circuit 90, a grounding terminal of the j-th LED control circuit 10 is connected to a power terminal of the (j+1)-th LED control circuit 10, an output of the first switch circuit 60 is connected to a negative electrode of the power supply and a grounding terminal the DC-DC converter circuit 90, and an output of the signal transmission circuit 80 is connected to a control terminal of the first switch circuit 60.

The signal transmission circuit 80 is configured to output a first control signal. The first switch circuit 60 is configured to be switched on or switched off according to the first control signal; and the DC-DC converter circuit 90 is configured to clamp the voltage at the grounding terminal of the m-th LED control circuit when a unidirectional conducting circuit is conducting unidirectionally. Where, m is a natural number greater than 1, and j is a positive integer less than m.

When the first switch circuit 60 is configured to be switched off according to the first control signal, the DC-DC converter circuit 90 clamps the voltage at the grounding terminal of the m-th LED control circuit 10. Thus, the voltage difference between the voltage at the power terminal and the voltage at the grounding terminal in each LED control circuit 10 is less than a preset voltage, in this condition, the first voltage output by the voltage dividing circuit is less than the second voltage output by the buck circuit, and the digital signal is at a high level. When the first switch circuit 60 is configured to be switched on according to the first control signal, the voltage at the grounding terminal of the m-th LED control circuit 10 is connected to the negative electrode of the power supply. Thus, the voltage difference between the voltage at the power terminal and the voltage of the grounding terminal is greater than the preset voltage in each LED control circuit 10. In this condition, the first voltage output by the voltage dividing circuit is greater than the second voltage output by the buck circuit, and the digital signal is at a low level. Thus, transmitting instructions via ground wires to achieve the control of the LED is realized.

When the first switch circuit 60 is configured to be switched off according to the first control signal, the DC-DC converter circuit 90 clamps the voltage at the grounding terminal of the m-th LED control circuit 10, the voltage difference between the voltage at the power terminal and the voltage at the grounding terminal in each LED control circuit 10 is less than the preset voltage. In this condition, the third voltage output by the first level shifting circuit is less than the fourth voltage output by the second level shifting circuit, and the digital signal is at a high level. When the first switch circuit 60 is configured to be switched on according to the first control signal, the voltage at the grounding terminal of the m-th LED control circuit 10 is connected to the negative electrode of the power supply. Thus, in each LED control circuit 10, the voltage difference between the voltage at the power terminal and the voltage at the grounding terminal is greater than the preset voltage. In this condition, the third voltage output by the first level shifting circuit is greater than the fourth voltage output by the second level shifting circuit, and the digital signal is at a low level. Thus, transmitting instructions via ground wires to achieve the control of the LED is realized.

Figure 13:
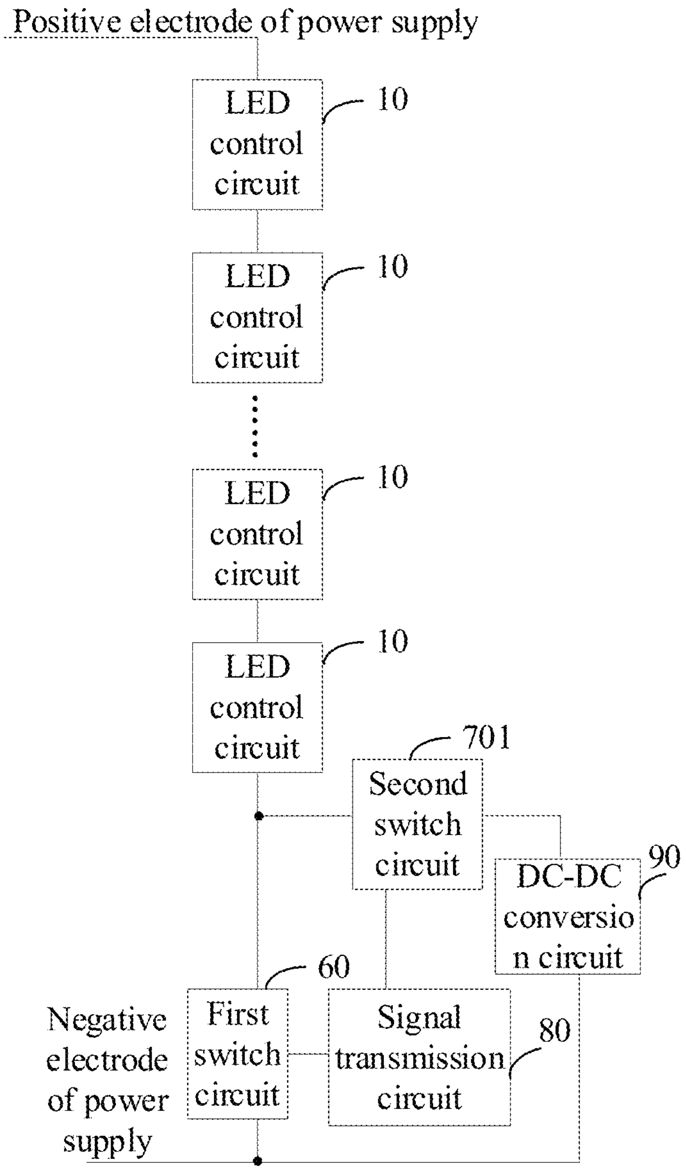
FIG. 13 is another schematic structural diagram of an electronic device provided in one embodiment of the present application.

As shown in FIG. 13, the electronic device further includes a second switch circuit 701.

A grounding terminal of the m-th LED control circuit 10 is connected to an input of the first switch circuit 60 and an input of the second switch circuit 701, and an output of the second switch circuit 701 is connected to an input of the DC-DC converter circuit 90. The signal transmission circuit 80 is further configured to output a second control signal. The second switch circuit 701 is configured to be switched on according to the second control signal to receive the voltage at the grounding terminal of the m-th LED control circuit 10, when the first switch circuit 60 is switched off.

The DC-DC converter circuit 90 is specifically configured to clamp the voltage at the grounding terminal of the m-th LED control circuit 10 when the second switch circuit 701 is switched on.

By providing the second switch circuit 701, when the first switch circuit 60 is configured to be switched on according to the first control signal, the second switch circuit 701 stops operation, the voltage at the grounding terminal of the m-th LED control circuit 10 is connected to the negative electrode of the power supply. Thus, the voltage at the grounding terminal of the m-th LED control circuit 10 is avoided from being connected to the DC-DC converter circuit 90, the voltage at the grounding terminal of the m-th LED control circuit 10 is avoided from being influenced by the DC-DC converter circuit 90, the stability and the reliability of the system are improved.

Figure 14:
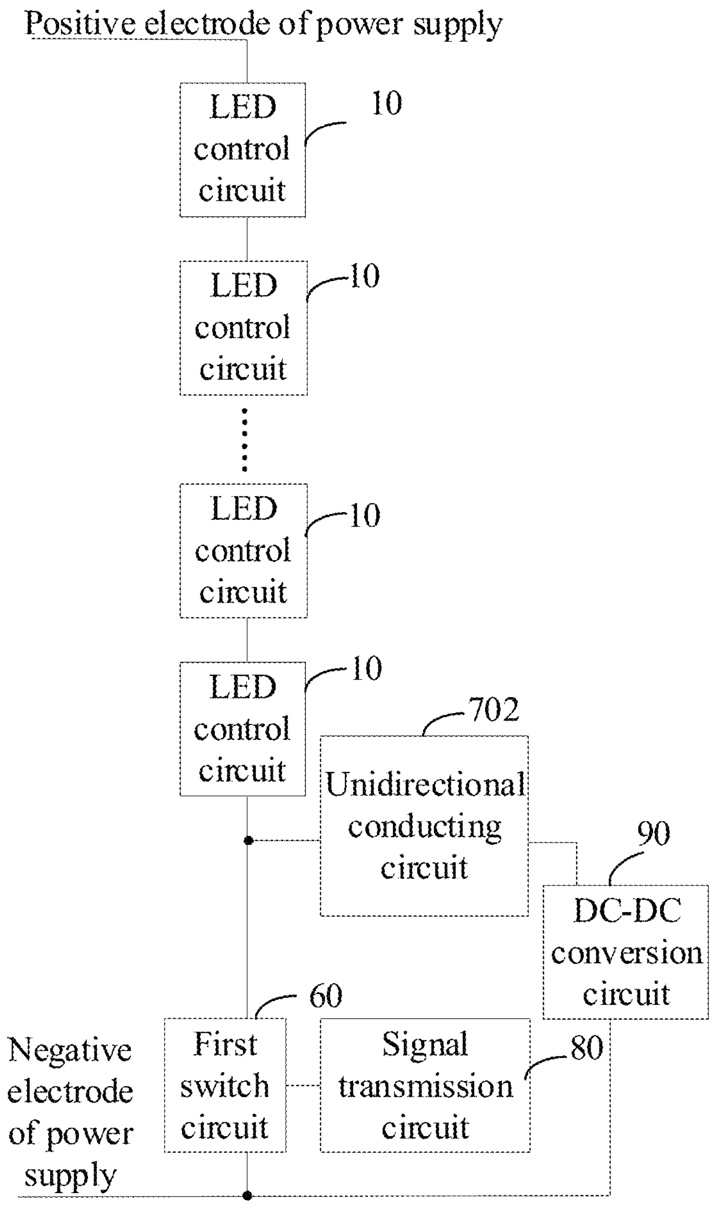
FIG. 14 is another schematic structural diagram of an electronic device provided in one embodiment of the present application.

As shown in FIG. 14, the electronic device further includes a unidirectional conducting circuit 702.

A grounding terminal of the m-th LED control circuit 10 is connected to an input of the first switch circuit 60 and an input of the unidirectional conducting circuit 702, and an output of the unidirectional conducting circuit 702 is connected to an input of the DC-DC converter circuit 90.

The unidirectional conducting circuit 702 is configured to enable the voltage at the grounding terminal of the M-th LED control circuit 10 to be conductive unidirectionally when the first switch circuit 60 is switched off.

The DC-DC converter circuit 90 is specifically configured to clamp the voltage at the grounding terminal of the m-th LED control circuit 10 when the unidirectional conducting circuit 702 is conducting unidirectionally.

By providing the unidirectional conducting circuit 702, when the first switch circuit 60 is configured to be switched on according to the first control signal, the unidirectional conducting circuit 702 stops operation, the voltage at the grounding terminal of the m-th LED control circuit 10 is connected to the negative electrode of the power supply, the voltage at the grounding terminal of the m-th LED control circuit 10 is prevented from being connected to the DC-DC converter circuit 90, the voltage at the grounding terminal of the m-th LED control circuit 10 is avoided from being influenced by the DC-DC converter circuit 90, the stability and the reliability of the system are improved.

When the first switch circuit 60 is configured to be switched off according to the first control signal, the unidirectional conducting circuit 702 enables the voltage at the grounding terminal of the M-th LED control circuit 10 to be conductive unidirectionally, and the DC-DC converter circuit 90 clamps the voltage at the grounding terminal of the M-th LED control circuit 10. Thus, in each LED control circuit 10, the voltage difference between the voltage at the power terminal and the voltage at the grounding terminal is less than the preset voltage, in this condition, the first voltage output by the voltage dividing circuit is less than the second voltage output by the buck circuit, and the digital signal is at a high level. When the first switch circuit 60 is configured to be switched on according to the first control signal, the unidirectional conducting circuit 702 stops operation, and the voltage at the grounding terminal of the m-th LED control circuit 10 is connected to the negative electrode of the power supply. Thus, the voltage difference between the voltage at the power terminal and the voltage of the grounding terminal is greater than the preset voltage in each LED control circuit 10. In this condition, the first voltage output by the voltage dividing circuit is greater than the second voltage output by the buck circuit, and the digital signal is at a low level. Thus, transmitting instructions via ground wires is implemented and the control of the LED is realized.

When the first switch circuit 60 is configured to be switched off according to the first control signal, the unidirectional conducting circuit 702 enables the voltage at the grounding terminal of the M-th LED control circuit 10 to be unidirectionally conductive, and the DC-DC converter circuit 90 clamps the voltage at the grounding terminal of the M-th LED control circuit 10. Thus, in each LED control circuit 10, the voltage difference between the voltage at the power terminal and the voltage at the grounding terminal is less than the preset voltage, in this condition, the third voltage output by the first level shifting circuit is less than the fourth voltage output by the second level shifting circuit, and the digital signal is at a high level. When the first switch circuit 60 is configured to be switched on according to the first control signal, the unidirectional conducting circuit 702 stops operation, the voltage at the grounding terminal of the m-th LED control circuit 10 is connected to the negative electrode of the power supply. Thus, the voltage difference between the voltage at the power terminal and the voltage of the grounding terminal is greater than the preset voltage in each LED control circuit 10. In this condition, the third voltage output by the first level shifting circuit is greater than the fourth voltage output by the second level shifting circuit, the digital signal is at a low level. Thus, transmitting instructions via ground wires to achieve the control of the LED is realized.

Figure 15:
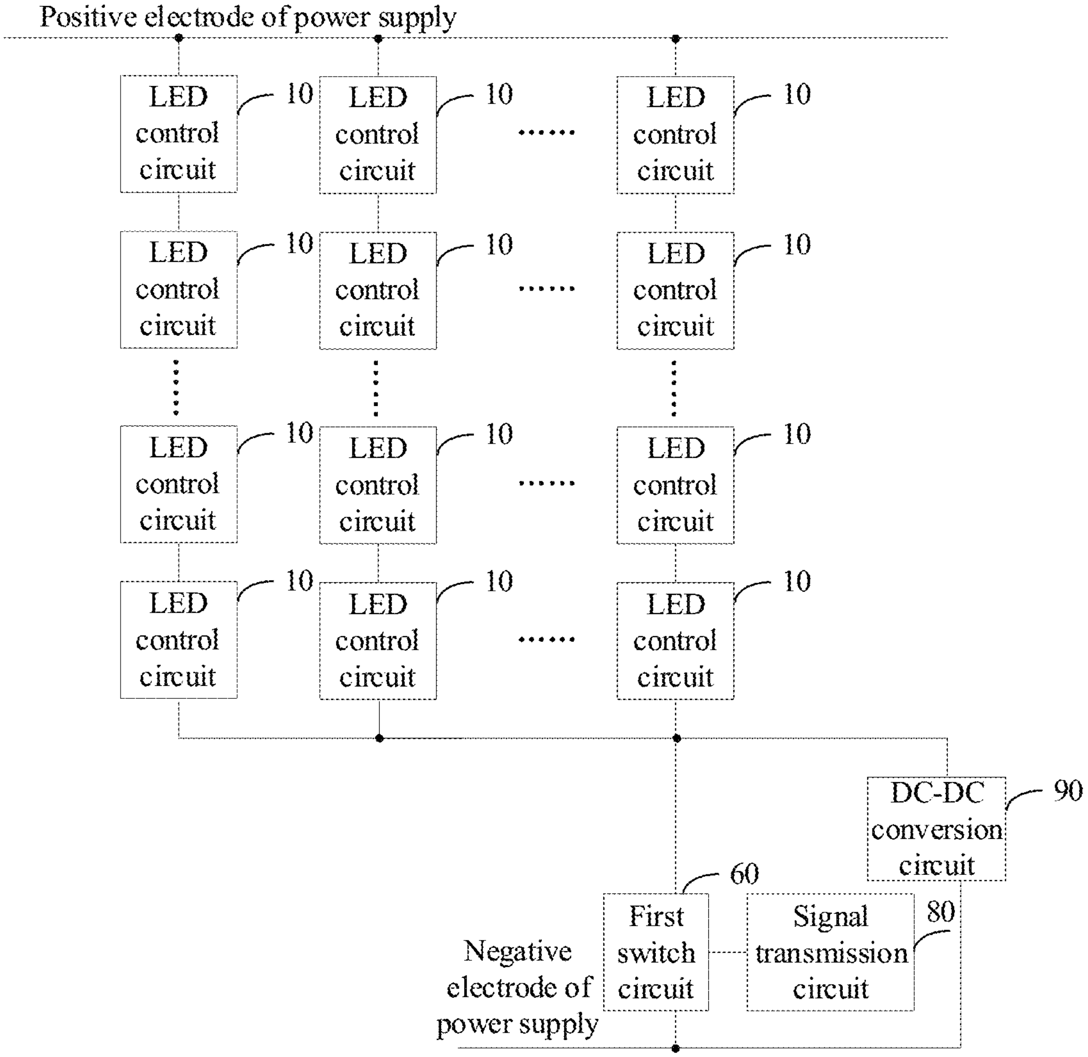
FIG. 15 is another schematic structural diagram of an electronic device provided in one embodiment of the present application.

As shown in FIG. 15, the electronic device further includes one or multiple groups of LED control circuits 10, where each group of LED control circuits includes m LED control circuits 10 connected in series.

Figure 16:
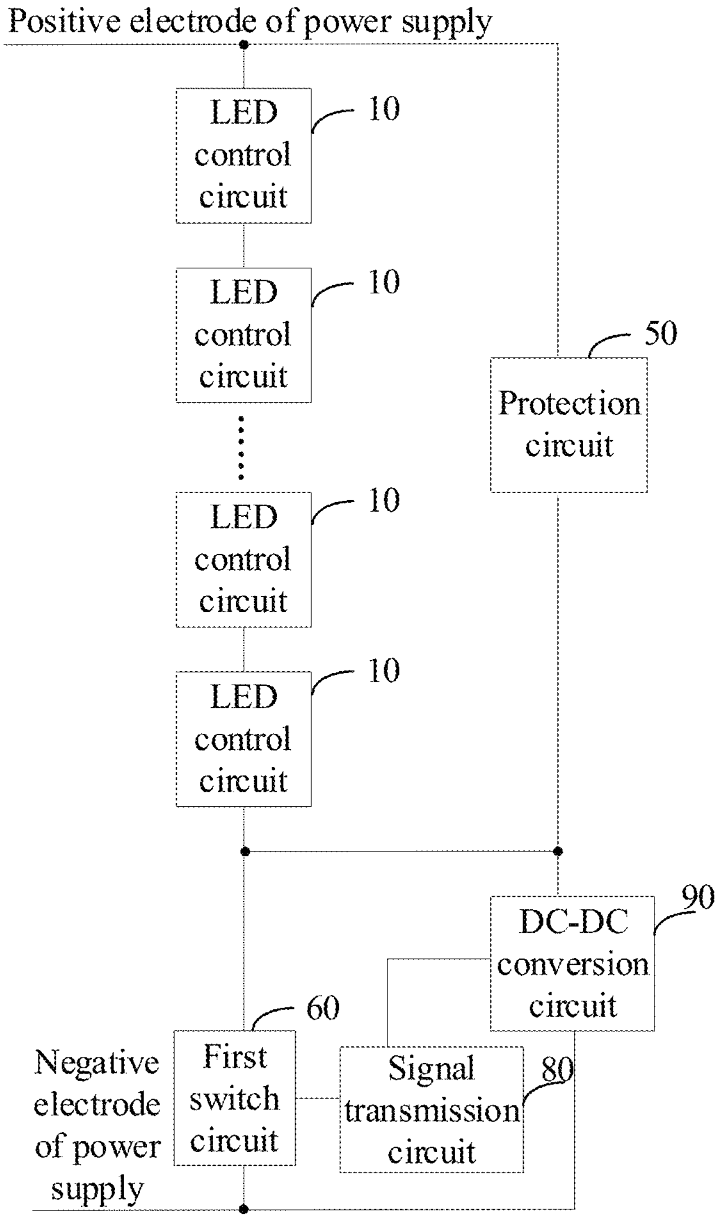
FIG. 16 is another schematic structural diagram of an electronic device provided in one embodiment of the present application.

As shown in FIG. 16, the electronic device further includes a protection circuit 50.

The protection circuit 50 is connected between the power terminal of the first LED control circuit 10 and the grounding terminal of the m-th LED control circuit 10, and is configured to filter out a peak signal in a voltage between the power terminal of the first LED control circuit 10 and the grounding terminal of the m-th LED control circuit 10.

It should be noted that the DC-DC converter circuit 90 is further connected to the signal transmission circuit 80, and is further configured to output an internal power supply voltage according to the voltage at the grounding terminal GND of the m-th LED control circuit to supply power to the signal transmission circuit 80.

Figure 17:
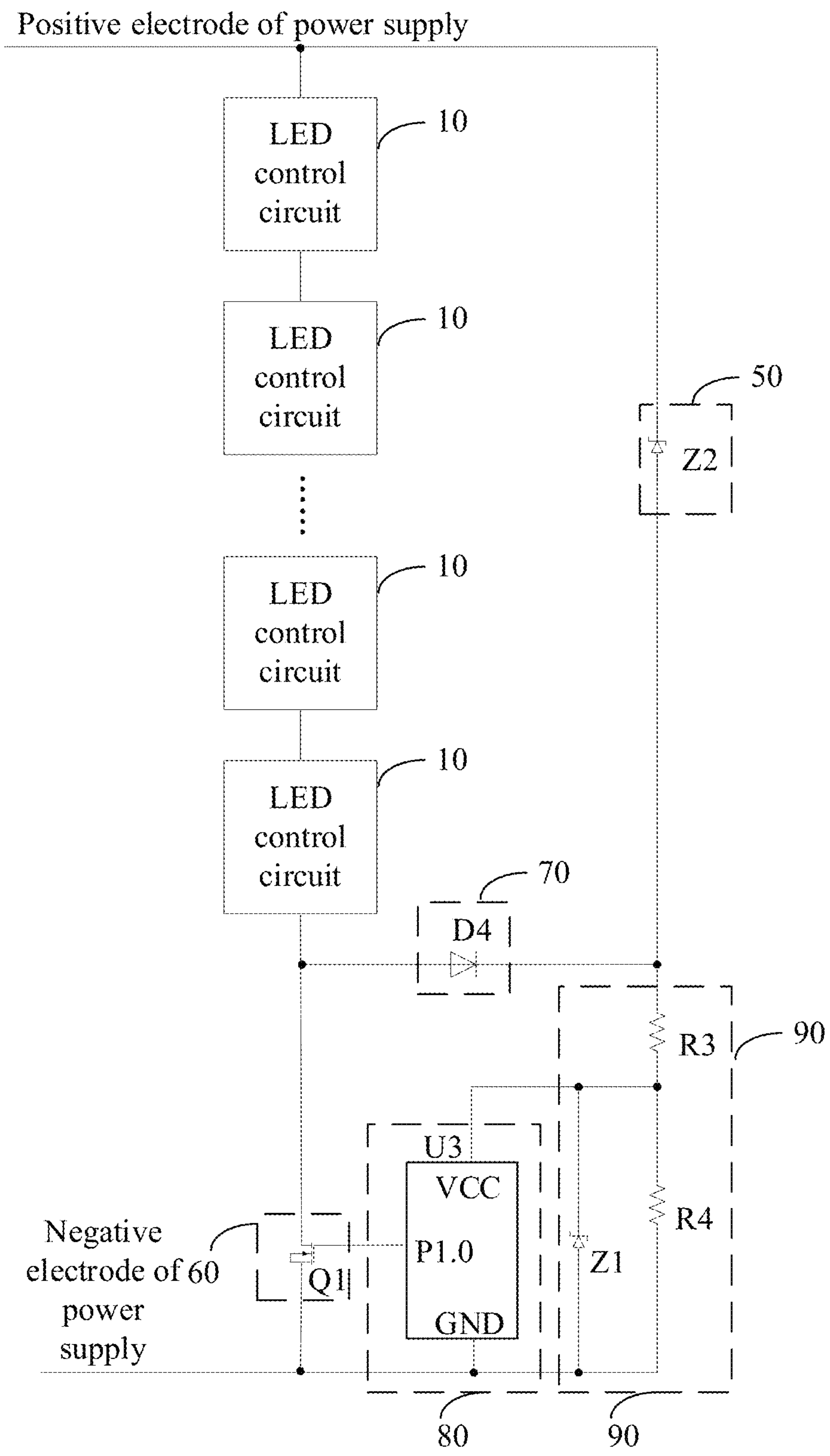
FIG. 17 is an exemplified circuit principle diagram of a part of the electronic device provided in one embodiment of the present application.

As shown in FIG. 17, the DC-DC converter circuit 90 includes a third resistor R3, a fourth resistor R4, and a first Zener diode Z1. A first end of the third resistor R3 serves as a voltage input of the DC-DC converter circuit 90, and is connected to the unidirectional conducting circuit 70 so as to access a voltage at the grounding terminal GND of the m-th LED control circuit. A second end of the third resistor R3, a first terminal of the fourth resistor R4, and a negative electrode of the first Zener diode are used together as an internal supply voltage output of the DC-DC converter circuit 90, and are connected to the signal transmission circuit 80 to output an internal supply voltage. A second end of the fourth resistor R4 and a positive electrode of the first Zener diode Z1 are connected to a negative electrode of the power supply.

As shown in FIG. 17, the signal transmission circuit 80 includes a microprocessor U3; a power terminal VCC of the microprocessor U3 serves as an internal supply voltage input of the signal transmission circuit 80 and is connected to the DC-DC converter circuit 90 to access an internal power supply voltage. A first general input/output P1.0 of the microprocessor U3 serves as a first control signal output of the signal transmission circuit 80, is connected to the first switch circuit 60 to output a first control voltage. A grounding terminal GND of the microprocessor U3 is connected to the negative electrode of the power supply.

The first switch circuit 60 includes a switch transistor Q1, the unidirectional conducting circuit 70 includes a second diode D4. The protection circuit 50 includes a second Zener diode Z2.

In the embodiments of the present application, the LED control circuit has the power terminal, the grounding terminal, and the plurality of control signal outputs, and the level recognition circuit outputs the digital signal according to the voltage difference between the voltage at the power terminal and the voltage at the grounding terminal. The decoding circuit parses the digital signal to obtain the control data of the LED control circuit, and outputs the plurality of control signals to the plurality of control signal outputs respectively according to the control data. Since the level recognition circuit outputs the digital signal according to the voltage difference between the voltage at the power terminal and the voltage at the grounding terminal, the level recognition circuit does not need to take the reference voltage as the reference signal. Thus, a reference circuit for providing the reference voltage is omitted, a circuit configuration is simplified and a hardware cost is reduced.

The aforesaid embodiments are only intended to explain the technical solutions of the present application, rather than limiting the technical solutions of the present application. Although the present application has been described in detail with reference to these embodiments, a person of ordinary skilled in the art should understand that, the technical solutions disclosed in the aforesaid embodiments may also be amended, or alternatively, some technical features in the technical solutions may also be equivalently replaced. The amendments or the equivalent replacements don't cause the essence of the corresponding technical solutions to be deviated from the spirit and the scope of the technical solutions in the embodiments of the present application, and thus should all be included in the protection scope of the present application.

The invention claimed is:

1. An LED control circuit, having a power terminal, a grounding terminal, and a plurality of control signal outputs, the LED control circuit comprising:

a level recognition circuit, connected to the power terminal and the grounding terminal of the LED control circuit, and being configured to output a digital signal according to a voltage difference between a voltage at the power terminal and a voltage at the grounding terminal; and a decoding circuit, connected to the level recognition circuit and the plurality of control signal outputs of the LED control circuit, and being configured to parse the digital signal to obtain control data of the LED control circuit, and output a plurality of control signals to the plurality of control signal outputs according to the control data.

2. The LED control circuit according to claim 1, further comprising:

a digital filter circuit, connected between the level recognition circuit and the decoding circuit, and being configured to perform digital filtering on the digital signal;

wherein the decoding circuit is specifically configured to parse the digitally filtered digital signal to obtain the control data of the LED control circuit, and output the plurality of control signals to the plurality of control signal outputs according to the control data.

3. The LED control circuit according to claim 1, wherein the plurality of control signal outputs of the LED control circuit are connected to a driving circuit;

the driving circuit is configured to output a plurality of driving signals according to the plurality of control signals, to enable a plurality of luminescent devices to emit light.

4. The LED control circuit according to claim 1, wherein the level recognition circuit comprises:

a voltage dividing circuit, connected to the power terminal and the grounding terminal of the LED control circuit, and being configured to divide the voltage difference between the voltage at the power terminal and the voltage at the grounding terminal to output a first voltage;

a buck circuit, connected to the power terminal and the grounding terminal of the LED control circuit, and being configured to perform a voltage drop of a preset value on the voltage at the power terminal to output a second voltage; and a first comparison circuit, connected to the decoding circuit, the voltage dividing circuit and the buck circuit, and being configured to compare the first voltage with the second voltage and output the digital signal according to a comparison result.

5. The LED control circuit according to claim 4, wherein the buck circuit comprises a first field-effect transistor and a first current source;

a source electrode of the first field-effect transistor is connected to the power terminal of the LED control circuit, an output of the first current source is connected to the grounding terminal of the LED control circuit, a drain electrode of the first field-effect transistor, a gate electrode of the first field-effect transistor and an input of the first current source are used together as a second voltage output of the buck circuit, and are connected to the first comparison circuit to output the second voltage.

6. The LED control circuit according to claim 5, wherein the first comparison circuit comprises a first comparator;

a non-inverting input of the first comparator serves as a second voltage input of the first comparison circuit, and is connected to the buck circuit to access the second voltage; an inverting input of the first comparator serves as a first voltage input of the first comparison circuit, and is connected to the voltage dividing circuit to access the first voltage; an output of the first comparator serves as a digital signal output of the comparison circuit, and is connected to the decoding circuit to output the digital signal.

7. The LED control circuit according to claim 4, wherein the buck circuit comprises a first diode and a second current source;

a positive electrode of the first diode is connected to the power terminal of the LED control circuit, an output of the second current source is connected to the grounding terminal of the LED control circuit, and a negative electrode of the first diode and the input of the first current source are used together as a second voltage output of the buck circuit, and are connected to the first comparison circuit to output the second voltage.

8. The LED control circuit according to claim 4, wherein the voltage dividing circuit comprises a first resistor and a second resistor;

a first end of the first resistor is connected to the power terminal of the LED control circuit, a first end of the second resistor is connected to the grounding terminal of the LED control circuit, a second end of the first resistor and a second terminal of the second resistor are used together as a first voltage output of the voltage dividing circuit, and are connected to the first comparison circuit to output the first voltage.

9. The LED control circuit according to claim 1, wherein the level recognition circuit comprises:

a first level shifting circuit, connected to the power terminal and the grounding terminal of the LED control circuit, and being configured to perform a level shifting on the voltage at the grounding terminal to output a third voltage;

a second level shifting circuit, connected to the power terminal and the grounding terminal of the LED control circuit, and being configured to perform the level shifting on the voltage at the power terminal to output a fourth voltage; and a second comparison circuit, connected to the decoding circuit, the first level shifting circuit and the second level shifting circuit, and being configured to compare the third voltage with the fourth voltage, and output the digital signal according to a comparison result.

10. The LED control circuit according to claim 9, wherein the first level shifting circuit comprises a second field-effect transistor and a second current source;

a first end of the second current source is connected to the power terminal of the LED control circuit, a source electrode of the second field-effect transistor is connected to the grounding terminal of the LED control circuit, a second end of the second current source, a gate electrode of the second field-effect transistor, and a drain electrode of the second field-effect transistor are used together as a third voltage output of the first level shifting circuit, and are connected to the second comparison circuit to output the third voltage.

11. The LED control circuit according to claim 9, wherein the first level shifting circuit comprises a second diode and a third current source;

a first end of the third current source is connected to the power terminal of the LED control circuit, a negative electrode of the second diode is connected to the grounding terminal of the LED control circuit, a second end of the third current source and a positive electrode of the second diode are used together as a third voltage output of the first level shifting circuit, and are connected to the second comparison circuit to output the third voltage.

12. The LED control circuit according to claim 9, wherein the second level shifting circuit comprises a third field-effect transistor and a fourth current source;

a source electrode of the third field-effect transistor is connected to the power terminal of the LED control circuit, an output of the fourth current source is connected to the grounding terminal of the LED control circuit, a drain electrode of the third field-effect transistor, a gate electrode of the third field-effect transistor and an input of the fourth current source are used together as a fourth voltage output of the second level shifting circuit, and are connected to the second comparison circuit to output the fourth voltage.

13. The LED control circuit according to claim 9, wherein the second level shifting circuit comprises a third diode and a fifth current source;

a positive electrode of the third diode is connected to the power terminal of the LED control circuit, an output of the fifth current source is connected to the grounding terminal of the LED control circuit, a negative electrode of the third diode and an input of the fifth current source are used together as a fourth voltage output of the second level shifting circuit, and are connected to the second comparison circuit to output the fourth voltage.

14. The LED control circuit according to claim 9, wherein the second comparison circuit comprises a second comparator;

a non-inverting input of the second comparator serves as a fourth voltage input of the second comparison circuit, and is connected to the second level shifting circuit to access the fourth voltage; an inverting input of the second comparator serves as a third voltage input of the second comparison circuit, and is connected to the first level shifting circuit to access the third voltage; an output of the second comparator serves as a digital signal output of the second comparison circuit, and is connected to the decoding circuit to output the digital signal.

15. The LED control circuit according to claim 1, wherein the decoding circuit is further configured to provide power supply according to the voltage difference between the voltage at the power terminal and the voltage at the grounding terminal, the LED control circuit further comprises:

a shunt circuit, connected between the power terminal and the grounding terminal, and being configured to shunt a current between the power terminal and the grounding terminal.

16. An electronic apparatus, comprising a controller and n LED control circuits;

wherein a power terminal of a first LED control circuit in the LED control circuits is connected to a positive electrode of a power supply and a power terminal of the controller, a grounding terminal of a n-th LED control circuit in the n LED control circuits is connected to an input of the controller, a grounding terminal of a i-th LED control circuit in the n LED control circuits is connected to a power terminal of a (i+1)-th LED control circuit in the n LED control circuits, and an output of the controller is connected to a negative electrode of the power supply;

each LED control circuit comprises:

a level recognition circuit, connected to the power terminal and the grounding terminal of the LED control circuit, and being configured to output a digital signal according to a voltage difference between a voltage at the power terminal and a voltage at the grounding terminal; and a decoding circuit, connected to the level recognition circuit and the plurality of control signal outputs of the LED control circuit, and being configured to parse the digital signal to obtain control data of the LED control circuit, and output a plurality of control signals to the plurality of control signal outputs according to the control data;

the controller is configured to control an input of the controller and an output of the controller to be switched on/off;

wherein, n is a natural number greater than 1, and i is a positive integer less than n.

17. An electronic device, comprising a DC-DC converter circuit, a signal transmission circuit, a first switch circuit, and m LED control circuits;

wherein a power terminal of a first LED control circuit in the n LED control circuits is connected to a positive electrode of a power supply, a grounding terminal of a m-th LED control circuit in the n LED control circuits is connected to an input of the first switch circuit and an input of the DC-DC conversion circuit, a grounding terminal of a j-th LED control circuit in the n LED control circuits is connected to a power terminal of a (j+1)-th LED control circuit in the n LED control circuits, an output of the first switch circuit is connected to a negative electrode of the power supply and a grounding terminal of the DC-DC conversion circuit, and an output of the signal transmission circuit is connected to a control terminal of the first switch circuit;

each LED control circuit comprises:

a level recognition circuit, connected to the power terminal and the grounding terminal of the LED control circuit, and being configured to output a digital signal according to a voltage difference between a voltage at the power terminal and a voltage at the grounding terminal; and a decoding circuit, connected to the level recognition circuit and the plurality of control signal outputs of the LED control circuit, and being configured to parse the digital signal to obtain control data of the LED control circuit, and output a plurality of control signals to the plurality of control signal outputs according to the control data;

the signal transmission circuit is configured to output a first control signal;

the first switch circuit is configured to be switched on or switched off according to the first control signal;

the DC-DC conversion circuit is configured to clamp a voltage at a grounding terminal of each of the m LED control circuits when the first switch circuit is switched off;

wherein, m is a natural number greater than 1, and j is a positive integer less than M.

18. The electronic device according to claim 17, further comprising a second switch circuit;

a grounding terminal of the m-th LED control circuit is connected to an input of the first switch circuit and an input of the second switch circuit, and an output of the second switch circuit is connected to an input of the DC-DC conversion circuit;

the signal transmission circuit is further configured to output a second control signal;

the second switch circuit is configured to be switched on to access the voltage at the grounding terminal of the m-th LED control circuit according to the second control signal, when the first switch circuit is switched off;

the DC-DC conversion circuit is specifically configured to clamp the voltage at the grounding terminal of the m-th LED control circuit when the second switch circuit is switched on.

19. The electronic device according to claim 17, wherein the electronic device further comprises a unidirectional conducting circuit;

the grounding terminal of the m-th LED control circuit is connected to the input of the first switch circuit and an input of the unidirectional conducting circuit, and an output of the unidirectional conducting circuit is connected to the input of the DC-DC conversion circuit;

the unidirectional conducting circuit is configured to enable a voltage at the grounding terminal of the m-th LED control circuit to be conductive unidirectionally when the first switch circuit is switched off;

the DC-DC conversion circuit is specifically configured to clamp the voltage at the grounding terminal of the m-th LED control circuit when the unidirectional conducting circuit is unidirectionally conductive.

20. The electronic device according to claim 17, wherein the electronic device comprises one or multiple groups of the LED control circuits;

wherein each of the multiple groups of the LED control circuits comprises m LED control circuits connected in series.

21. The electronic device according to claim 17, further comprising a protection circuit;

the protection circuit is connected between the power terminal of the first LED control circuit and the grounding terminal of the m-th LED control circuit, and is configured to filter out a peak signal in a voltage between the power terminal of the first LED control circuit and the grounding terminal of the m-th LED control circuit.

22. The electronic device according to claim 17, wherein the DC-DC conversion circuit is further connected to the signal transmission circuit, and is further configured to output an internal supply voltage according to the voltage at the grounding terminal of the m-th LED control circuit so as to supply power to the signal transmission circuit.

23. The electronic device according to claim 22, wherein the DC-DC conversion circuit comprises a third resistor, a fourth resistor, and a first Zener diode;

a first end of the third resistor serves as a voltage input of the DC-DC conversion circuit, and is connected to the unidirectional conducting circuit to access a voltage at the grounding terminal of the m-th LED control circuit;

a second end of the third resistor, a first end of the fourth resistor and a negative electrode of the first Zener diode are used together as an internal supply voltage output of the DC-DC conversion circuit, and are connected to the signal transmission circuit to output the internal power supply voltage;

a second end of the fourth resistor and a positive electrode of the first Zener diode are connected in common to the negative electrode of the power supply.

24. The electronic device according to claim 22, wherein the signal transmission circuit comprises a microprocessor;

a power terminal of the microprocessor serves as an internal supply voltage input of the signal transmission circuit, and is connected to the DC-DC conversion circuit to access the internal supply voltage;

a first general input and output of the microprocessor serves as a first control signal output of the signal transmission circuit, and is connected to the first switch circuit to output the first control voltage; and a grounding terminal of the microprocessor is connected to the negative electrode of the power supply.

* * * * *